(12) United States Patent
Oh et al.

(10) Patent No.: US 11,529,795 B2
(45) Date of Patent: Dec. 20, 2022

(54) STEEL SHEET PLATED WITH AL—FE FOR HOT PRESS FORMING HAVING EXCELLENT CORROSION RESISTANCE AND SPOT WELDABILITY, AND MANUFACTURING METHOD THEREOF

(71) Applicant: POSCO, Pohang-si (KR)

(72) Inventors: Jin-Keun Oh, Gwangyang-si (KR); Seong-Woo Kim, Gwangyang-si (KR); Sang-Heon Kim, Gwangyang-si (KR); Yeol-Rae Cho, Pohang-si (KR)

(73) Assignee: POSCO HOLDINGS INC., Seoul (KR)

( * ) Notice: Subject to any disclaimer, the term of this patent is extended or adjusted under 35 U.S.C. 154(b) by 0 days.

(21) Appl. No.: 17/297,920

(22) PCT Filed: Nov. 29, 2019

(86) PCT No.: PCT/KR2019/016763
§ 371 (c)(1),
(2) Date: May 27, 2021

(87) PCT Pub. No.: WO2020/111881
PCT Pub. Date: Jun. 4, 2020

(65) Prior Publication Data
US 2022/0048277 A1 Feb. 17, 2022

(30) Foreign Application Priority Data
Nov. 30, 2018 (KR) .................. 10-2018-0152572
Nov. 29, 2019 (KR) .................. 10-2019-0156855

(51) Int. Cl.
*B32B 15/01* (2006.01)
*C22C 38/00* (2006.01)
(Continued)

(52) U.S. Cl.
CPC .......... *B32B 15/012* (2013.01); *C22C 38/001* (2013.01); *C22C 38/002* (2013.01);
(Continued)

(58) Field of Classification Search
CPC ..... C22C 38/001; C22C 38/002; C22C 38/02; C22C 38/04; C22C 38/06; C22C 38/28; C22C 38/32; B32B 15/012; C23C 28/02
(Continued)

(56) References Cited

U.S. PATENT DOCUMENTS 6,296,805 B1   10/2001  Laurent et al.
10,590,522 B2  3/2020   Oh et al.
(Continued)

FOREIGN PATENT DOCUMENTS

EP   3722447 A1   10/2020
JP   S61-104091 A  5/1986
(Continued)

OTHER PUBLICATIONS

Extended European Search Report dated Sep. 28, 2021 issued in European Patent Application No. 19890089.6.
(Continued)

*Primary Examiner* — Humera N. Sheikh
*Assistant Examiner* — Katherine A Christy
(74) *Attorney, Agent, or Firm* — Morgan, Lewis & Bockius LLP

(57) ABSTRACT

The present invention provides a steel sheet plated with aluminum-iron and a preparation method therefor, the steel sheet comprising: a base steel sheet; and a plated layer formed on the surface of the base steel sheet and comprising: an alloyed layer containing at least one of Fe3Al, FeAl(Si), Fe2Al5, and FeAl3; and an aluminum layer formed on the alloyed layer and having a thickness less than 10% of that of the plated layer, wherein the plated layer is 20-35 μm in
(Continued)

thickness and contains 1-20 wt % of Mg as measured by GDS at a position 0.1 μm deep from the surface of the plated layer and 10 wt % of oxygen as measured by GDS at a position 0.1 μm deep from the surface of the plated layer.

6 Claims, 3 Drawing Sheets

(51) Int. Cl.
    *C22C 38/02* (2006.01)
    *C22C 38/04* (2006.01)
    *C22C 38/06* (2006.01)
    *C22C 38/28* (2006.01)
    *C22C 38/32* (2006.01)
    *C23C 28/02* (2006.01)
    *C23C 2/12* (2006.01)
    *C23C 2/28* (2006.01)
    *C23C 2/40* (2006.01)
    *C23C 24/04* (2006.01)

(52) U.S. Cl.
    CPC .............. *C22C 38/02* (2013.01); *C22C 38/04* (2013.01); *C22C 38/06* (2013.01); *C22C 38/28* (2013.01); *C22C 38/32* (2013.01); *C23C 2/12* (2013.01); *C23C 2/28* (2013.01); *C23C 2/40* (2013.01); *C23C 24/04* (2013.01); *C23C 28/02* (2013.01)

(58) Field of Classification Search
    USPC ........................................................ 428/577
    See application file for complete search history.

(56) References Cited

U.S. PATENT DOCUMENTS

| | | |
|---|---|---|
| 10,837,094 B2 | 11/2020 | Kim et al. |
| 2017/0002450 A1 | 1/2017 | Kim et al. |
| 2020/0086608 A1 | 3/2020 | Oh et al. |
| 2020/0165712 A1* | 5/2020 | Beentjes .................. C23C 2/40 |

FOREIGN PATENT DOCUMENTS

| | | |
|---|---|---|
| JP | 2003-034845 A | 2/2003 |
| JP | 2003-049256 A | 2/2003 |
| JP | 2012-255204 A | 12/2012 |
| KR | 10-2009-0020751 A | 2/2009 |
| KR | 10-2015-0073531 A | 7/2015 |
| KR | 10-1591982 B1 | 2/2016 |
| KR | 10-1696121 B1 | 1/2017 |
| KR | 10-1839253 B1 | 3/2018 |
| KR | 10-2018-0074449 A | 7/2018 |
| WO | 2018/158165 A1 | 9/2018 |
| WO | 2018/158166 A1 | 9/2018 |

OTHER PUBLICATIONS

International Search Report dated Apr. 3, 2020 issued in International Patent Application No. PCT/KR2019/016763 (with English translation).

Japanese Office Action dated Aug. 9, 2022 issued in Japanese Patent Application No. 2021-529844.

* cited by examiner

[Fig. 1]
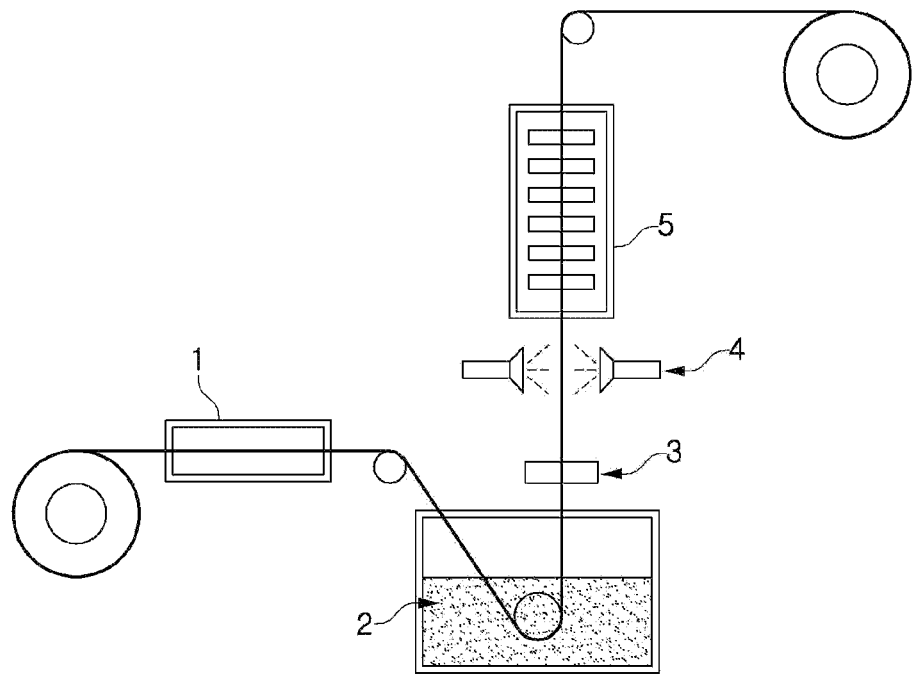
[Fig. 2]
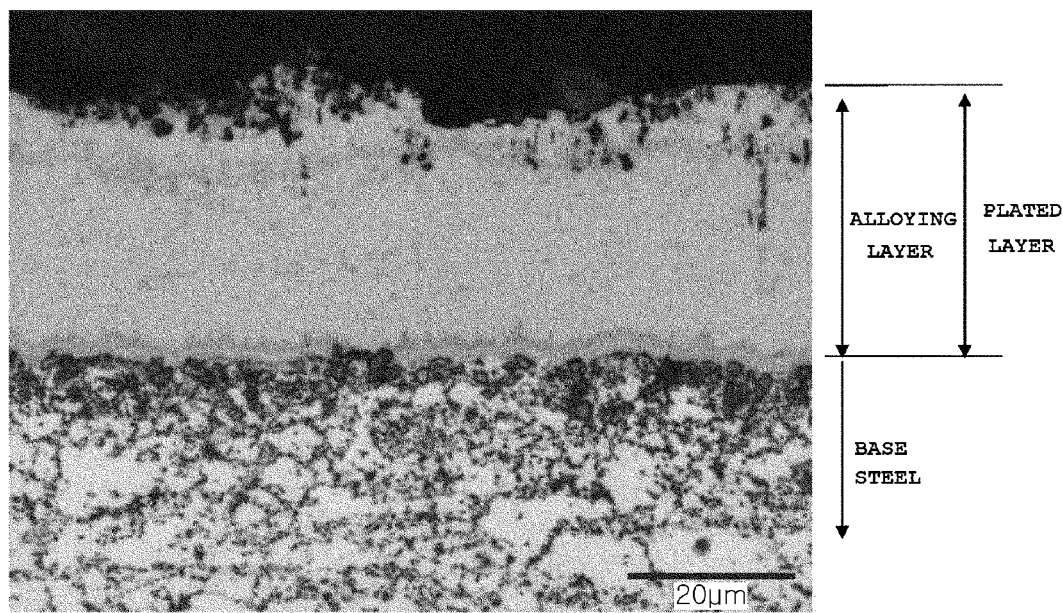

[Fig. 3]
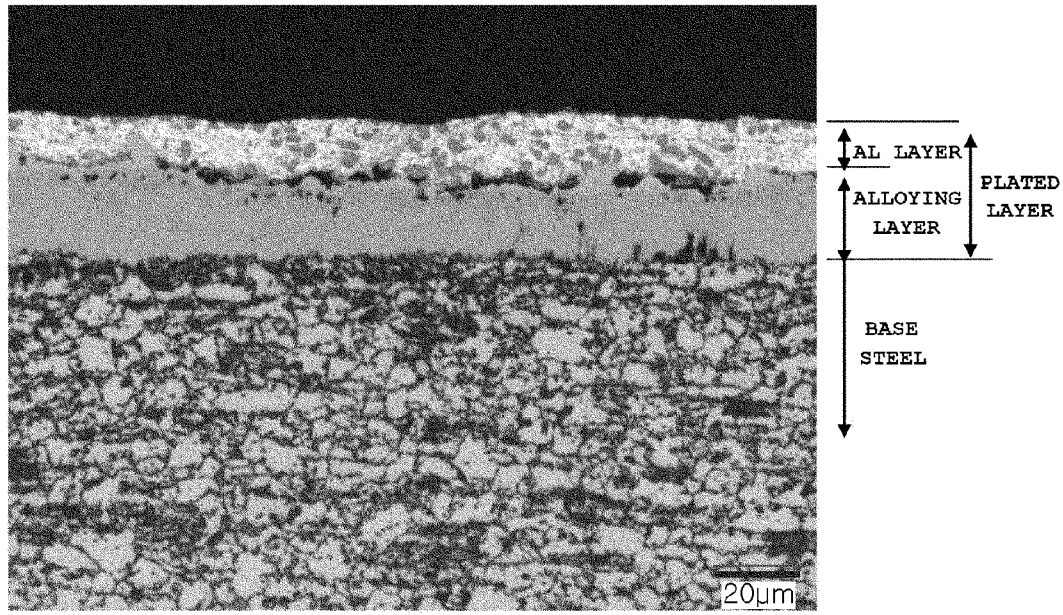
[Fig. 4]
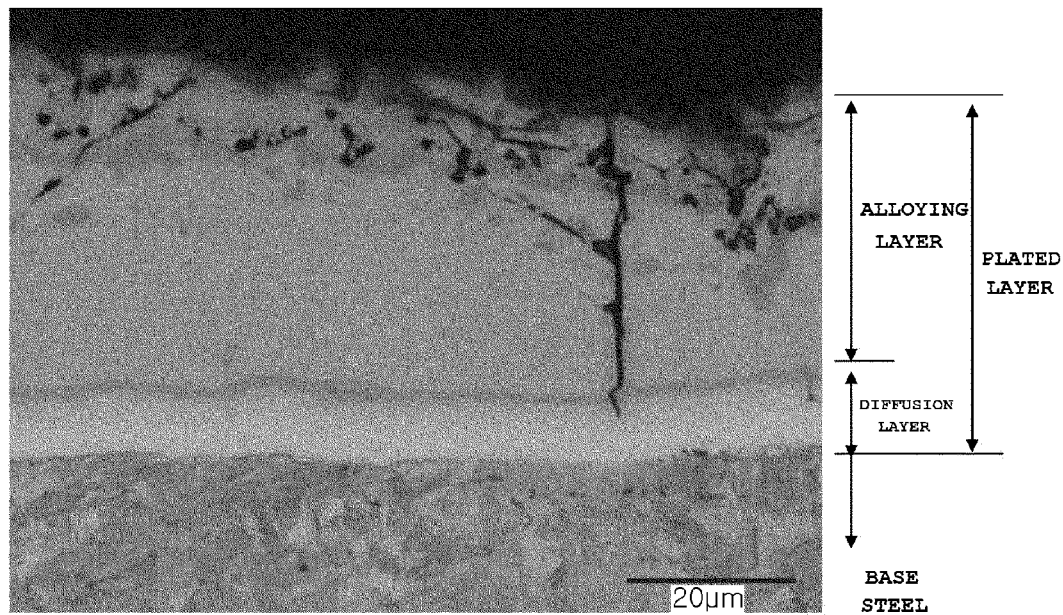

[Fig. 5]
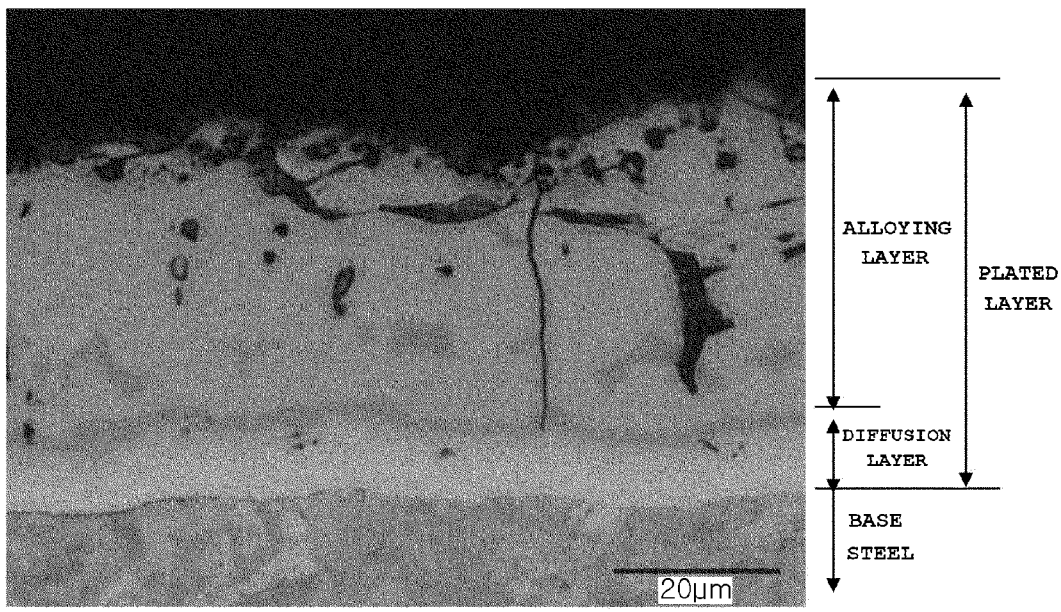

STEEL SHEET PLATED WITH AL—FE FOR HOT PRESS FORMING HAVING EXCELLENT CORROSION RESISTANCE AND SPOT WELDABILITY, AND MANUFACTURING METHOD THEREOF

CROSS-REFERENCE OF RELATED APPLICATIONS

This application is the U.S. National Phase under 35 U.S.C. § 371 of International Patent Application No. PCT/KR2019/016763, filed on Nov. 29, 2019, which in turn claims the benefit of Korean Application Nos. 10-2018-0152572, filed on Nov. 30, 2018 and 10-2019-0156855, filed on Nov. 29, 2019, the entire disclosures of which applications are incorporated by reference herein.

TECHNICAL FIELD

The present disclosure relates to an aluminum iron-based plated steel sheet for hot press forming having excellent corrosion resistance and spot weldability, and a method of manufacturing the same.

BACKGROUND ART

In recent years, due to the depletion of petroleum energy resources and high interest in environmental protection, regulations on improving the fuel efficiency of automobiles are becoming stronger. In terms of materials, reducing a thickness of a steel sheet used in automobiles is one method for improving the fuel efficiency of automobiles. However, reducing the thickness of a steel sheet may cause problems in the safety of automobiles, such that the strength of the steel sheet should be supported.

Accordingly, there has been continuous demand for high-strength steel sheets, and various types of steel sheets have been developed. However, since such steel sheets have high strength in themselves, workability thereof is poor. That is, since a product of strength and elongation for each grade of steel sheet tends to always have a constant value, when the strength of the steel sheet increases, there may be an issue such as a decrease in elongation, an index of workability.

To address the above issue, a hot press forming method has been proposed. The hot press forming method is a method of forming a low temperature structure, such as martensite, in a steel sheet by forming at a high temperature suitable for forming and then quenching the steel sheet at a low temperature to increase the strength of an end product. In this case, a workability-related issue may be significantly reduced when manufacturing a member having high strength.

However, according to the above-described hot press forming method, a surface of the steel sheet may be oxidized because the steel is heated to a high temperature. Accordingly, after the press forming, a process of removing an oxide from the surface of the steel sheet should be added. As a method of addressing such an issue, Patent Document 1 has been proposed. According to Patent Document 1, a steel sheet subjected to aluminum plating is used in a process of hot press forming or heating and quenching after room-temperature forming (briefly, post-heat treatment). Since an aluminum plated layer is present on a surface of the steel sheet, the steel sheet is not oxidized at the time of heating.

A process of heating a steel sheet is performed to hot-press form the above-described aluminum-plated steel sheet. In this process, a temperature of the steel sheet is increased to diffuse iron (Fe) from base steel of the steel sheet to a plated layer on a surface of the steel sheet. Thus, alloying occurs in the plated layer.

When such an aluminum-plated steel sheet is hot-press formed, cracking occurs in a plated layer of a portion adhered to a die at the time of pressing. Moreover, in a portion bent by pressing, high tensile stress may be applied to an outermost surface of a plated layer to cause cracking to occur from a surface due to vulnerability of an alloy layer when tensile stress is applied. When the cracking penetrates through the plated layer due to a low thickness of an aluminum-plated layer to expose a surface of a base steel sheet, corrosion resistance of a finally obtained hot-press formed member may be reduced.

Patent Document 1

U.S. Pat. No. 6,296,805

DISCLOSURE

Technical Problem

An aspect of the present disclosure is to provide an aluminum-iron-based plated steel sheet for hot press forming having excellent corrosion resistance and spot weldability, and a method of manufacturing the same.

On the other hand, the feature of the present disclosure is not limited to the above description. It will be understood by those skilled in the art that there would be no difficulty in understanding additional features of the present disclosure.

Technical Solution

According to an aspect of the present disclosure, an aluminum-iron-based plated steel sheet comprises a base steel sheet and a plated layer formed on a surface of the base steel sheet. The plated layer comprises an alloying layer, formed on the surface of the base steel sheet and containing at least one of $Fe_3Al$, $FeAl(Si)$, $Fe_2Al_5$, and $FeAl_3$, and an aluminum layer formed on the alloying layer and having a thickness less than 10% of a thickness of the plated layer. The plated layer has a thickness of 20 to 35 μm, and contains 1 to 20 weight % of, measured by a glow discharge spectrometer (GDS) at a position 0.1 μm deep from a surface of the plated layer, and 10 weight % or less of oxygen measured by the GDS at a position 0.1 μm deep from the surface of the plated layer.

According to an aspect of the present disclosure, the plated layer may include, by weight %, silicon (Si): 7 to 15%, magnesium (Mg): 1.1 to 15%, and a balance of aluminum (Al) and inevitable impurities, when the other alloy composition, except for the content of iron (Fe) diffused from the base steel sheet, is set to be 100%.

According to an aspect of the present disclosure, the base steel sheet may include, by weight %, carbon (C): 0.04 to 0.5%, silicon (Si): 0.01 to 2%, manganese (Mn): 0.01 to 10%, aluminum (Al): 0.001 to 1.0%, phosphorus (P): 0.05% or less, sulfur (S): 0.02% or less, nitrogen (N): 0.02% or less, and a balance of iron (Fe) and inevitable impurities.

According to an aspect of the present disclosure, the base steel sheet may further include at least one of, by weight %, a sum of at least one selected from the group consisting of chromium (Cr), molybdenum (Mo), and tungsten (W): 0.01 to 4.0%; a sum of at least one selected from the group consisting of titanium (Ti), niobium (Nb), zirconium (Zr), and vanadium (V): 0.001 to 0.4%; copper+nickel (Cu+Ni): 0.005 to 2.0%; antimony+tin (Sb+Sn): 0.001 to 1.0%; and boron (B): 0.0001 to 0.01%.

According to another aspect of the present disclosure, a hot press formed member obtained by hot-press forming the above-described aluminum-iron-based plated steel sheet is provided.

A method of manufacturing an aluminum-iron-based plated steel sheet used for hot press forming according to another aspect of the present disclosure comprises: preparing a base steel sheet; immersing the base steel sheet in an aluminum plating bath, containing, by weight %, silicon (Si): 7 to 15%, magnesium (Mg): 1.1 to 15%, and a balance of aluminum (Al) and inevitable impurities, to be plated at an plating amount of 40 to 100 g/m$^2$ for each side to obtain an aluminum-plated steel sheet; performing initial cooling to a temperature of 640° C. or more at a cooling rate of 0.1 to 5° C./sec immediately after the aluminum plating; and obtaining an aluminum-iron-based plated steel sheet through on-line alloying in which a heat treatment is performed, continuously, subsequently to the initial cooling, within a heating temperature range of 670 to 900° C. fora holding time of 1 to 20 seconds.

According to an aspect of the present disclosure, the method may further include spraying aluminum powder onto a surface of the aluminum-plated steel sheet after the initial cooling.

According to an aspect of the present disclosure, an average particle diameter of the aluminum powder may be 5 to 40 μm.

The technical solutions to the above-mentioned problems do not fully enumerate all features of the present disclosure. Various features of the present disclosure and the resulting advantages and effects will be understood in more detail with reference to the following detailed examples.

Advantageous Effects

As set forth above, in an aluminum-iron-based plated steel sheet for hot press forming, a plated layer may be formed on a base steel sheet before a heating process for hot press forming and a thickness and a composition of the plated layer may be appropriately controlled, and thus, corrosion resistance and spot weldability of a hot press formed member may be improved.

In addition, contents of silicon (Si) and magnesium (Mg) in a composition of a plating bath may be appropriately adjusted to perform an on-line alloying heat treatment in which a heat treatment is performed continuously and immediately after a plated layer is formed, and thus, a steel sheet plated with aluminum-iron having reduced manufacturing costs and improved productivity may be provided.

The various and beneficial advantages and effects of the present disclosure are not limited to the above description, and can be more easily understood in the course of describing a specific embodiment of the present disclosure.

DESCRIPTION OF DRAWINGS

FIG. 1 is a schematic diagram of a manufacturing apparatus in which a manufacturing method according to an aspect of the present disclosure is implemented.

FIG. 2 is an image, illustrating a cross-section of an aluminum-iron-based plated steel sheet manufactured in Inventive Example 1, captured using a scanning electron microscope (SEM).

FIG. 3 is an image, illustrating a cross-section of an aluminum-iron-based plated steel sheet manufactured in Comparative Example 1, captured using a scanning electron microscope (SEM).

FIG. 4 is an image, illustrating a cross-section of an aluminum-iron-based plated steel sheet manufactured in Inventive Example 1 after hot-press forming, captured using a scanning electron microscope (SEM).

FIG. 5 is an image, illustrating a cross-section of an aluminum-iron-based plated steel sheet manufactured in Comparative Example 1 after hot-press forming, captured using a scanning electron microscope (SEM).

BEST MODE FOR INVENTION

Hereinafter, a steel sheet plated with aluminum-iron according to an aspect of the present disclosure will be described in detail.

In the present disclosure, it should be noted that the content of each element means weight % unless otherwise specified. In addition, it should be noted that a ratio of grains and structures is based on an area unless otherwise specified.

[An Aluminum-Iron-Based Plated Steel Sheet]

The aluminum-iron-based plated steel sheet according to an example embodiment of the present disclosure may comprise a base steel sheet and a plated layer formed on a surface of the base steel sheet. The plated layer may comprise an alloying layer, formed on the surface of the base steel sheet and containing at least one of $Fe_3Al$, $FeAl(Si)$, $Fe_2Al_5$, and $FeAl_3$, and an aluminum layer formed on the alloying layer and having a thickness less than 10% of a thickness of the plated layer. The plated layer may have a thickness of 20 to 35 μm and may contain 1 to 20 weight % of magnesium (Mg), measured by a glow discharge spectrometer (GDS) at a position 0.1 μm deep from a surface of the plated layer in a thickness direction, and 10 weight % or less of oxygen measured by the GDS at a position 0.1 μm deep from the surface of the plated layer in the thickness direction.

The aluminum-iron-based plated steel sheet according to an example embodiment of the present disclosure may comprise a base steel sheet and a plated layer formed on a surface of the base steel sheet. In addition, the plated layer may comprise an alloying layer, formed on the surface of the base steel sheet and containing at least one of $Fe_3Al$, $FeAl(Si)$, $Fe_2Al_5$, and $FeAl_3$, and an aluminum layer formed on the alloying layer.

When the base steel sheet is plated with aluminum (Al) and then subjected to an alloying heat treatment, iron (Fe) of the base steel sheet may be diffused to an Al-plated layer containing a high content of aluminum. As a result, an alloying layer, including (or being consisted of) an Al—Fe intermetallic compound formed by the diffusion, may be formed on the base steel sheet. An alloy phase of the Al—Fe intermetallic compound, constituting the alloying layer, may be, but is not limited to being, $Fe_3Al$, $FeAl(Si)$, $Fe_2Al_5$, $FeAl_3$, or the like.

For example, the alloying layer may include at least one of $Fe_3Al$, $FeAl(Si)$, $Fe_2Al_5$, and $FeAl_3$. In addition, according to an aspect of the present disclosure, the alloying layer may mainly include at least one of $Fe_3Al$, $FeAl(Si)$, $Fe_2Al_5$, and $FeAl_3$.

Specifically, the alloying layer may contain 50% or more of at least one of $Fe_3Al$, $FeAl(Si)$, $Fe_2Al_5$, and $FeAl_3$, in detail, 80% or more of the same, in further detail, 90% or more of the same, and, in yet further detail, 95% or more of the same.

For example, according to an aspect of the present disclosure, the alloying layer may mainly include an alloy phase of at least one of $Fe_3Al$, $FeAl(Si)$, $Fe_2Al_5$, and $FeAl_3$, but may include a small amount of inevitable impurities and other elements likely to be included in a plating bath.

For example, in the present disclosure, when magnesium (Mg) is added, a portion of Mg may be included in an Al—Fe alloy phase in the alloying layer, and the alloying layer may include other alloy phases including an Al—Fe—Mg alloy phase.

An aluminum layer, having a composition identical to a component of an original plated layer or containing iron (Fe) diffused in a small amount from the base steel sheet, may be present on the above-described alloying layer. In some cases, the aluminum layer may not be present due to full alloying.

The thickness of the plated layer may be 20 to 35 μm. When the thickness of the plated layer is less than 20 μm, corrosion resistance may be significantly poor. On the other hand, when the thickness of the plated layer is greater than 35 μm, weldability may be deteriorated. Therefore, in the present disclosure, the thickness of the plated layer may be limited to, in detail, 20 to 35 μm and, in further detail, 20 to 30 μm.

The content of magnesium (Mg), measured by a glow discharge spectrometer (GDS) at a position 0.1 μm deep from the surface of the plated layer, may be 1 to 20 weight %. In an aluminum plating bath according to the present disclosure, Mg may be added in an amount of 1.1 to 15 weight % to improve corrosion resistance and to increase an alloying rate. However, since Mg in the plated layer tends to diffuse to the surface of the plated layer to be enriched, the content of Mg measured by the GDS at a position 0.1 μm deep from the surface of the plated layer may be 1 to 20 weight %, in detail, 2 to 15 weight %, and, in further detail, 3 to 10 weight %.

In addition, the content of oxygen measured by the GDS at a position 0.1 μm deep from the surface of the plated layer may be 10 weight % or less. In the present disclosure, the alloy heat treatment is performed for a short time by increasing a temperature, rather than cooling, after hot-dip aluminum plating, so that an increase in the content of oxygen in the surface of the plated layer may be effectively suppressed. When the content of oxygen in the surface of the plated layer is greater than 10 weight %, surface quality of the plated layer may be deteriorated. Meanwhile, the smaller the content of oxygen in the surface of the plated layer, the more advantageous it is. Therefore, a lower limit of the content of oxygen in the surface of the plated layer may not be limited.

An aluminum layer, mainly formed of aluminum, may be provided on the alloying layer at a surface side in the plated layer. In the present disclosure, the thickness of the aluminum layer may be controlled to be less than 10% of the thickness of the plated layer. In some cases, the aluminum layer may not be present due to sufficient alloying (for example, including the case in which the thickness of the aluminum layer is 0% of the thickness of the plated layer). An interface between the aluminum layer and the alloying layer in the plated steel sheet may be unstable. Therefore, when the thickness of the aluminum layer is greater than 10% of the thickness of the plated layer, peeling of the aluminum layer may occur when the steel sheet is coiled after the alloying heat treatment.

The smaller the thickness of the aluminum layer, the more advantageous it is. Therefore, a lower limit of the thickness of the aluminum layer may not be limited. The thickness of the aluminum layer may be, in detail, less than 5% of the thickness of the plated layer, in further detail, less than 1% thereof, and, in yet further detail, 0% thereof.

According to an example embodiment, the plated layer may include, by weight %, 7 to 15% of silicon (Si), 1.1 to 15% of magnesium (Mg), and a balance of aluminum (Al) and inevitable impurities, when the other alloy composition, except for the content of iron (Fe) diffused from the base steel sheet, is set to be 100%.

Silicon (Si) serves to promote uniform alloying with iron (Fe) in the plated layer. To obtain such an effect, silicon should be contained in an amount of 7% or more. Silicon also serves to suppress the diffusion of iron, so that when silicon is contained in an amount greater than 15%, the diffusion of iron may be excessively suppressed to fail to obtain a plating structure desired in the present disclosure. The content of silicon may be, in detail, 7 to 14%, and, in further detail, 7.5 to 13.1%.

Magnesium (Mg) serves to improve corrosion resistance of the plated steel sheet, and has an effect of increasing an alloying rate. To obtain the above effect, magnesium should be contained in an amount of 1.1% or more. On the other hand, when magnesium is contained in an amount greater than 15%, weldability and paintability may be deteriorated. The content of magnesium may be, in detail, 1.1 to 11% and, in further detail, 1.5 to 10.5%.

According to an example embodiment, the base steel sheet is a steel sheet for hot press forming, and is not limited as long as it is used for hot press forming. As a non-limiting example, the base steel sheet may have a composition including, by weight %, 0.04 to 0.5% of carbon (C), 0.01 to 2% of silicon (Si), 0.01 to 10% of manganese (Mn), 0.001 to 1.0% of aluminum (Al), 0.05% or less of phosphorus (P), 0.02% or less of sulfur (S), and 0.02% or less of nitrogen (N).

C: 0.04 to 0.5%

Carbon (C) may be added in an appropriate amount as an essential element for increasing the strength of a heat treatment member. For example, to secure sufficient strength of the heat treatment member, carbon may be added in an amount of 0.04% or more. A lower limit of the content of carbon may be, in detail, 0.1% or more. However, when the content of carbon is too high, cold rollability may be significantly deteriorated and spot weldability may be significantly reduced because strength of a hot-rolled material is too high when the hot-rolled material is cold rolled in the case in which a cold-rolled material is prepared. Therefore, carbon may be added in an amount of 0.5% or less to secure sufficient cold rollability and spot weldability. In addition, the content of carbon may be 0.45% or less, and may be limited to, in further detail, 0.4% or less.

Si: 0.01 to 2%

Silicon (Si) needs to be added as a deoxidizer in steelmaking, and serves to suppress formation of a carbide which most affects strength of a hot-press formed member. In the present disclosure, silicon may be added in an amount of 0.01% or more such that retained austenite is secured by enriching carbon into grain boundaries of martensite lath after martensite is formed. In addition, when aluminum plating is performed on the steel sheet after rolling, an upper limit of the content of silicon may be set to be 2% to secure sufficient platability. The content of silicon may be limited to, in detail, 1.5% or less.

Mn: 0.01 to 10%

Manganese (Mn) may be added in an amount of 0.01% or more to secure a solid solution strengthening effect and to decrease a critical cooling rate for securing martensite in the hot-press formed member. In addition, the content of manganese may be 10% or less in terms of securing workability of a hot press forming process by appropriately maintaining the strength of the steel sheet, reducing manufacturing costs, and improving spot weldability. The content of manganese may be, in detail, 9% or less and, in some cases, 8% or less.

Al: 0.001 to 1.0%

Aluminum (Al) may have a deoxidizing action in steelmaking, together with silicon, to increase the cleanliness of steel. To such an effect, aluminum may be added in an amount of 0.001% or more. In addition, the content of aluminum may be limited to 1.0% or less to prevent an Ac3 temperature from significantly increasing such that heating required during hot press forming may be performed within an appropriate temperature range.

P: 0.05% or Less

Phosphorus (P) is present as an impurity in steel. If possible, the smaller the content of phosphorus, the more advantageous it is. Therefor, the content of phosphorus may be limited to 0.05% or less and, in detail, 0.03% or less. The smaller the amount of phosphorus which is an impurity element, the more advantageous it is. Accordingly, there is no need to set an upper limit of the content of phosphorus. However, since manufacturing costs may be increased to excessively reduce the amount of phosphorus, a lower limit of the content of phosphorus may be set to be 0.001%, in view of the foregoing.

S: 0.02% or Less

Sulfur (S) is an impurity in steel, and is an element deteriorating ductility, impact characteristics, and weldability of a member. Therefore, a maximum content of sulfur may be limited to 0.02% and, in detail, 0.01% or less. In addition, since manufacturing costs may be increased when a minimum content of phosphorus is less than 0.0001%, a lower limit of the content of sulfur may be 0.0001%.

N: 0.02% or Less

Nitrogen (N) is an element included as an impurity in steel. To reduce sensitivity to the occurrence of cracking during slab continuous casting and to secure impact characteristics, the lower the content of nitrogen, the more advantageous it is. Therefore, nitrogen may be contained in an amount of 0.02% or less. A lower limit of the content of nitrogen does not need to be determined, but the content of nitrogen may be set to be 0.001% or more in consideration of an increase in manufacturing costs, or the like.

In the present disclosure, as necessary, at least one of a sum of at least one selected from the group consisting of Cr, Mo, and W: 0.01 to 4.0%; a sum of at least one selected from the group consisting of Ti, Nb, Zr, and V: 0.001 to 0.4%; Cu+Ni: 0.005 to 2.0%; Sb+Sn: 0.001 to 1.0%; and B: 0.0001 to 0.01% may be further added, other than the above-described steel composition.

Sum of at Least One Selected from the Group Consisting of Cr, Mo, and W: 0.01% to 4.0%

Chromium (Cr), molybdenum (Mo), and tungsten (W) may improve hardenability and secure strength and grain refinement through a precipitation strengthening effect, so that at least one thereof may be added in an amount of 0.01% or more, based on the total content. To secure weldability of the heat treatment member, the content thereof may be limited to 4.0% or less. When the content thereof is greater than 4.0%, an effect may be saturated. Therefore, the content thereof may be limited to 4.0% or less.

Sum of at Least One Selected from the Group Consisting of Ti, Nb, Zr, and V: 0.001 to 0.4%

Titanium (Ti), niobium (Nb), and vanadium (V) are effective in improving a steel sheet of the heat treatment member by forming fine precipitates and in stabilizing retained austenite and improving impact toughness by grain refinement. Therefore, sum of at least one of Ti, Nb, and V may be added in a total amount of 0.001% or more. However, when the added amount thereof is greater than 0.4%, an effect may be saturated. Moreover, costs may be increased due to excessive addition of ferroalloy.

Cu+Ni: 0.005 to 2.0%

Copper (Cu) and nickel (Ni) are elements forming fine precipitates to improve strength. To obtain the above-described effects, a sum of contents of one or more thereof may be 0.005% or more. However, when the sum is greater than 2.0%, costs may be excessively increased. Therefore, an upper limit thereof may be 2.0%.

Sb+Sn: 0.001 to 1.0%

Antimony (Sb) and tin (Sn) may be enriched in a surface during an annealing heat treatment for Al—Si plating such that formation of a silicon or manganese oxide on the surface is suppressed to improve platability. Antimony and tin may be added in an amount of 0.001% or more to obtain such an effect. However, when an added amount thereof is greater than 1.0%, excessively ferroalloy costs may be incurred, and antimony and tin may be solid-solubilized in grain boundaries to cause coil edge cracking during hot rolling. Therefore, an upper limit thereof may be 1.0%.

B: 0.0001 to 0.01%

Boron (B) is an element which may improve hardenability and may be segregated in a prior austenite grain boundary to suppress embrittlement of a hot-press formed member caused by grain boundary segregation of phosphorus and/or sulfur. Therefore, boron may be added in an amount of 0.001% or more. However, when the content of boron is greater than 0.01%, the effect may be saturated and embrittlement may occur during hot rolling. Therefore, an upper limit of the content of boron may be 0.01% and, in an example embodiment, be 0.005% or less.

A balance may be iron (Fe) and inevitable impurities, other than the above-mentioned elements. Moreover, addition of other elements is not limited as long as they can be contained in the steel sheet for hot press forming.

When an aluminum-iron-based plated steel sheet, including a plated layer having the above-described layer structure, is thermally treated at a temperature range of 880 to 950° C. for 3 to 10 minutes and is then hot-press formed to manufacture a hot-press formed member, a diffusion layer (consisted of FeAlSi and Fe$_3$Al) and an alloying layer, consisted of Fe$_2$Al$_5$ and FeAlSi, may be formed to improve corrosion resistance. In addition, a spot welding current range may satisfy 1 kA or more to improve spot weldability.

Hereinafter, a method of manufacturing an aluminum-iron-based plated steel sheet for hot press forming will be described. However, a method of manufacturing an aluminum-iron-based plated steel sheet for hot press forming described below is only an example and it does not mean that the aluminum-iron-based plated steel sheet for hot press forming according to the present disclosure should be manufactured by the present manufacturing method, and it is to be noted that any manufacturing method satisfies the claims of the present disclosure and there is no problem in implementing each embodiment of the present disclosure.

[Method of Manufacturing an Aluminum-Iron-Based Plated Steel Sheet]

An aluminum-iron-based plated steel sheet according to another aspect of the present disclosure may be obtained by performing hot-dip aluminum plating on a surface of a hot-rolled or cold-rolled base steel sheet at a plating amount of 40 to 100 g/m$^2$ for each side using an aluminum plating bath containing, by weight %, 7 to 15% of silicon (Si), 1.1 to 15% of magnesium (Mg), and a balance of aluminum (Al) and inevitable impurities, and then performing an on-line alloying treatment in which a heat treatment is performed immediately after initial cooling after plating process.

Obtaining an Aluminum-Plated Steel Sheet

In an example embodiment, a base steel sheet is prepared. By immersing the base steel sheet in an aluminum plating bath, containing 7 to 15% of Si, 1.1 to 15% of Mg, and a balance of Al and other inevitable impurities to plate Al on a surface of the base steel sheet at a plating amount of 40 to 100 g/m² for each side, an aluminum-plated steel sheet may be obtained. In addition, an annealing treatment may be selectively performed on a steel sheet before plating.

Silicon (Si) serves to promote uniform alloying with iron (Fe) in the plated layer. To obtain such an effect, silicon should be contained in an amount of 7% or more. However, since silicon serves to suppress diffusion of iron (Fe), when silicon is contained in an amount greater than 15%, an alloying rate may be reduced to make it difficult to obtain sufficient alloying. Therefore, the content of silicon contained in a plating bath may be limited to 7 to 15%, in detail, 7 to 14%, and, in further detail, 7.5 to 13.1%.

Magnesium (Mg) serves to improve corrosion resistance of the aluminum-iron-based plated steel sheet, and also serves to increase an alloying rate. To ensure a sufficient alloying rate, magnesium should be contained in an amount of 1.1% or more. On the other hand, when magnesium is contained in an amount greater than 15%, weldability and paintability may be deteriorated. Therefore, in the present disclosure, the content of magnesium contained in the aluminum plating bath may be limited to 1.1 to 11%, in detail, 1.5 to 10.5%, and, in further detail, 2 to 7%.

During the aluminum plating, a plating amount may be 40 to 100 g/m² for each side. When the plating amount is less than 40 g/m², corrosion resistance may be significantly deteriorated. On the other hand, when the plating amount is greater than 100 g/m², weldability may be reduced. Therefore, in the present disclosure, the plating amount may be limited to, in detail, 40 to 100 g/m² for each side during the aluminum plating. The plating amount during the aluminum plating may be, in further detail, 55 to 100 g/m² for each side.

Initial Cooling

After the aluminum plating, initial cooling may be performed to 640° C. or higher at a cooling rate of 0.1 to 5° C./sec. In addition, the initial cooling may be performed in a temperature range of, in detail, 640° C.~680° C. (640° C. or more to 680° C. or less) after the aluminum plating, and the cooling rate may be, in detail, 1 to 4° C./sec.

In the present disclosure, the initial cooling after the aluminum plating is important because the content of magnesium may be appropriately adjusted during alloying and/or hot press forming on a plated surface to secure corrosion resistance and spot weldability. When an initial cooling end temperature is less than 640° C., an equipment load may occur because more power should be applied for alloying in a subsequent on-line alloying heat treatment.

When the cooling rate is less than 0.1° C./sec, a solidified layer may be insufficiently formed on the plated surface, so that magnesium may be excessively diffused to the surface during the on-line alloying to deteriorate spot weldability of the hot rolling formed member. Meanwhile, when the cooling rate is greater than 5° C./sec, the plated layer may be excessively cooled, so that an equipment load and a time are lengthened to secure a predetermined temperature for alloying, resulting in a decrease in productivity.

Spraying Al Powder

After the initial cooling, aluminum powder may be sprayed on a surface of the aluminum-plated steel sheet. The aluminum powder may partially cool the surface, and may refine surface spangle. In this case, when only the surface is partially cooled by the aluminum powder, diffusion of magnesium in the plated layer to the surface during a subsequent on-line alloying process may be further suppressed to reduce a magnesium oxide formed by diffusion of magnesium to the surface after hot press forming, and thus, spot weldability may be improved. In addition, the surface spangle may be refined to uniformly form the surface after the hot press forming.

An average particle diameter of the aluminum powder may be 5 to 40 μm, in further detail, 10 to 30 μm, and, in yet further detail 10 to 25 μm. When the average particle diameter of the aluminum powder is less than 5 μm, surface cooling and spangle refinement effects may be insufficient. On the other hand, when the mean particle diameter is greater than 40 μm, particles may be insufficiently dissolved in the plated layer and may remain on the surface, resulting in a surface quality problem.

In the present disclosure, the amount of the sprayed aluminum powder may be determined within a limitation satisfying the condition in which a surface temperature is not decreased below 640° C. after spraying the powder. When the surface temperature of the steel sheet is decreased below 640° C. after spraying the powder, an equipment load may occur because more power should be applied to perform alloying in a subsequent on-line alloying heat treatment. The amount of the sprayed aluminum powder is related to the surface temperature of the steel sheet, but the surface temperature of the steel sheet may vary significantly depending on process conditions, equipment, environmental conditions, and the like, during the spraying, and thus, may not be uniformly determined. Therefore, the amount of the sprayed aluminum powder is sufficient as long as it satisfies the above conditions, and a specific range of the amount of the sprayed aluminum powder may not be limited. However, as a non-limiting example, the aluminum powder may be sprayed within a range of 0.01 to 10 g/m² of the aluminum-plated steel sheet.

Performing Alloying Heat Treatment to Obtain the Aluminum-Iron-Based Plated Steel Sheet An on-line alloying treatment, in which a heat treatment is performed continuously after performing the initial cooling and/or immediately after spraying the aluminum powder, may be performed. At the time of the alloying heat treatment, a heating temperature may be within the range of 670 to 900° C. and a holding time may be 1 to 20 seconds. In further detail, the heating temperature may be within the range of 680 to 880° C., and the holding time may be 1 to 10 seconds.

In the present disclosure, the on-line alloying treatment refers to a process of performing a heat treatment by increasing a temperature after hot-dip aluminum plating, as can be seen in a schematic diagram of FIG. 1. In an on-line alloying heat treatment method according to the present disclosure, a heat treatment for alloying is started before a plated layer is cooled to be hardened after hot-dip aluminum plating, so that alloying may be performed within a short time without an additional process of increasing a temperature. However, since an alloying rate was low in a component system of a plated layer of a known aluminum-plated steel sheet according to the related art, efficiently alloying may not be finished within a short time, and thus, it was difficult to apply an on-line alloying method in which a heat treatment is performed immediately after plating. However, in the present disclosure, an alloying rate of the plated layer is increased by controlling plating bath components affecting the alloying rate, in particular, silicon (Si) and magnesium (Mg), so that alloying of the aluminum plated layer may be effectively finished in a short heat treatment time of 1 to 20 seconds.

The heating temperature is based on a surface temperature of a heat-treated steel sheet. When the heating temperature is less than 670° C., alloying may be insufficiently performed. On the other hand, when the heating temperature is greater than 900° C., it may be difficult to perform cooling after alloying. When the cooling rate is increased, strength of the base steel sheet may be excessively increased. Therefore, the heating temperature at the time of the alloying heat treatment may be limited to, in detail, 670 to 900° C. and, in further detail, 700 to 800° C.

During the alloying heat treatment, the holding time may be limited to 1 to 20 seconds. In the present disclosure, the holding time refers to a time for which the heating temperature (including a deviation of ±10° C.) is held in the steel sheet. When the holding time is less than 1 second, the heating time may be too short to achieve sufficient alloying. On the other hand, when the holding time is greater than 20 seconds, productivity may be significantly reduced. Therefore, the holding time during the alloying heat treatment may be limited to, in detail, 1 to 20 seconds and, in further detail, 1 to 10 seconds.

The alloying of the plated layer through the alloying heat treatment depends on a heat treatment temperature and a holding time, but is also affected by contents of silicon (Si) and magnesium (Mg) contained in the aluminum-plated layer. The smaller the content of silicon contained in the aluminum-plated layer and the greater the content of magnesium contained therein, the higher the alloying rate. Therefore, a thickness of an alloyed region may be increased. When the on-line heat treatment is performed continuously, subsequently to the plating process, as in the present disclosure, a heat treatment time is relatively and significantly short, as compared with a batch annealing furnace (BAF) method. Therefore, a fully alloyed plated layer may not be obtained unless process conditions are precisely controlled. Accordingly, the present inventors may appropriately control the contents of silicon and magnesium and the heat treatment conditions to effectively obtain a fully alloyed plated layer in spite of a short heat treatment time of 1 to 20 seconds.

After the alloying is completed as described above, hot press forming may be performed to manufacture a formed member. In this case, the hot press forming may employ a method commonly used in the art. For example, the aluminum-iron-based plated steel sheet according to the present disclosure may be heated in a temperature range of 880 to 950° C. for 3 to 10 minutes, and then pressed to have a desired shape of the heated steel sheet, but the present disclosure is not limited thereto. In addition, the composition of the base steel sheet of the hot press-formed member may be the same as the above-described composition of the base steel sheet of the aluminum-iron-based plated steel sheet.

MODE FOR INVENTION

Hereinafter, embodiments of the present disclosure will be described more specifically through examples. However, the examples are for clearly explaining the embodiments of the present disclosure and are not intended to limit the scope of the present disclosure. The scope of the present disclosure may be determined by the matters described in the claims and the matters reasonably deduced therefrom.

EXAMPLE

A cold-rolled steel sheet for hot press forming having a composition listed in Table 1 was prepared as a base steel sheet, and aluminum plating was performed on a surface of the base steel sheet at a plating bath composition listed in Table 2 and a plating bath temperature of 660° C. Then, initial cooling and an alloying heat treatment were performed under the initial cooling and alloying heat treatment conditions listed in Table 2. A determination was made as to whether the plated layer peeled off. For determination, a three-point bending test was performed on a 60 mm×60 mm specimen using a punch having a diameter of 5 mm. As a result of the test, x indicates that the plated layer peeled off at a bending angle of 30 degrees, and o indicates that the plated layer did not peel off at a bending angle of 30 degrees. In the determination of a surface spangle, x indicated that a diameter was 5 mm or more, and o indicated that a diameter was less than 5 mm.

TABLE 1

| ELM* | C | Si | Mn | Al | P | S | N | Cr | Ti | B |
|---|---|---|---|---|---|---|---|---|---|---|
| CNT* (%) | 0.22 | 0.20 | 1.15 | 0.03 | 0.01 | 0.002 | 0.0054 | 0.2 | 0.03 | 0.0025 |

ELM*: Element
CNT*: Content

TABLE 2

| | Al-Plated Conditions | | Initial Cooling Conditions | | APD* of Al | Alloying Heat Treatment Conditons | | | |
|---|---|---|---|---|---|---|---|---|---|
| | Si | Mg | | | | | | | |
| PA* (g/m$^2$) | CNT* (Wt %) | CNT* (Wt %) | CET* (° C.) | CR* (° C./s) | Powder (μm) | Tmp* (° C.) | T* (sec) | PEEL* | SRF SPG* |
| IE 1 | 55 | 13.1 | 5.1 | 665 | 1.5 | 21 | 680 | 5 | ○ | ○ |
| IE 2 | 55 | 13.1 | 5.1 | 665 | 1.5 | 21 | 800 | 5 | ○ | ○ |
| IE 3 | 55 | 13.1 | 5.1 | 665 | 1.5 | 21 | 880 | 5 | ○ | ○ |
| CE 1 | 55 | 13.1 | 5.1 | 595 | 6.0 | 21 | 600 | 5 | X | ○ |

TABLE 2-continued

| | Al-Plated Conditions | | Initial Cooling Conditions | | APD* of Al Powder (μm) | Alloying Heat Treatment Conditons | | PEEL* | SRF SPG* |
|---|---|---|---|---|---|---|---|---|---|
| | PA* (g/m²) | Si CNT* (Wt %) | Mg CNT* (Wt %) | CET* (° C.) | CR* (° C./s) | | Tmp* (° C.) | T* (sec) | | |
| IE 4 | 80 | 7.5 | 10.5 | 655 | 2.0 | 16 | 680 | 10 | ○ | ○ |
| IE 5 | 80 | 7.5 | 10.5 | 655 | 2.0 | 16 | 800 | 10 | ○ | ○ |
| IE 6 | 80 | 7.5 | 10.5 | 655 | 2.0 | 16 | 880 | 10 | ○ | ○ |
| CE 2 | 80 | 7.5 | 10.5 | 590 | 6.0 | 16 | 600 | 10 | X | ○ |
| CE 3 | 80 | 7.5 | 10.5 | 655 | 2.0 | 60 | 950 | 10 | ○ | X |
| IE 7 | 70 | 9.1 | 1.5 | 662 | 1.8 | 18 | 680 | 1 | ○ | ○ |
| IE 8 | 70 | 9.1 | 1.5 | 662 | 1.8 | 18 | 800 | 1 | ○ | ○ |
| IE 9 | 70 | 9.1 | 1.5 | 662 | 1.8 | 18 | 880 | 1 | ○ | ○ |
| CE 4 | 70 | 9.1 | 1.5 | 662 | 1.6 | 9 | — | — | X | ○ |
| CE 5 | 70 | 9.1 | 1.5 | 662 | 1.6 | 9 | 680 | 0.1 | X | ○ |
| CE 6 | 70 | 9.1 | 1.5 | 662 | 1.6 | 9 | 600 | 5 | X | ○ |
| CE 7 | 70 | 9.1 | 1.5 | 662 | 1.6 | 9 | 880 | 25 | ○ | ○ |
| CE 8 | 70 | 9.1 | 1.5 | 662 | 1.6 | 9 | 950 | 5 | ○ | ○ |
| CE 9 | 80 | 17.5 | 0.1 | 645 | 0.05 | 3 | 800 | 10 | X | X |
| CE 10 | 80 | 9.0 | 20.8 | 650 | 2.1 | 55 | 800 | 10 | ○ | X |
| CE 11 | 80 | 17.4 | 2.1 | 647 | 2.5 | 32 | 800 | 10 | X | ○ |

PA*: Plating Amount
Si CNT*: Content of Si
Mg CNT*: Content of Mg
CET*: Cooling End Temperature
CR*: Cooling Rate
APD*: Average Particle Diameter
Tmp*: Temperature
T*: Time
PEEL*: Whether plated layer peels off
SRF SPG*: Determination of Surface Spangle
IE: Inventive Example
CE: Comparative Example Each aluminum-iron-based plated steel sheet was heated at a temperature of 930° C. for 6 minutes in an air atmosphere, and then hot-press formed to obtain a hot press formed member. Then, a plated layer structure of the member and a GDS (using GDS 850A manufactured by LECO Corporation, USA) were observed, and corrosion resistance and spot weldability were measured and listed in Table 3. Corrosion resistance was measured by performing a phosphate treatment and a painting process on the member, making a crosscut, and measuring a blister width after a CCT 52 cycle. Spot weldability was estimated based on the ISO 18278 standard to analyze a current range. Corrosion resistance was determined to be poor when a blister width was 2.5 mm or more, and spot weldability was determined to be poor when a current range was less than 1 kA.

TABLE 3

| | aluminum-iron-based plated steel sheet | | | | | Hot Press Formed Member | | |
|---|---|---|---|---|---|---|---|---|
| | PA THK (μm) | AL THK* (μm) | CNT Mg in 0.1 μm deep* (wt %) | CNT O in 0.1 μm deep (wt %) | AL THK Ratio* (%) | CNT Mg in 0.1 μm deep* (wt %) | Corrosion Resistance (Blister Width) | SW CR* (kA) |
| IE 1 | 21.4 | 20.2 | 7.8 | 4.8 | 94 | 15.8 | 1.5 | 2.2 |
| IE 2 | 22 | 21.3 | 8.5 | 4.7 | 97 | 17.5 | 1.5 | 2.0 |
| IE 3 | 22.5 | 22.5 | 9.4 | 4.5 | 100 | 19.3 | 1.5 | 2.0 |
| CE 1 | 22.6 | 19.8 | 6.3 | 4.9 | 88 | 13.4 | 1.0 | 2.2 |
| IE 4 | 28.4 | 25.8 | 14.5 | 8.4 | 91 | 30.5 | 0.5 | 1.6 |
| IE 5 | 28.7 | 26.7 | 15.2 | 8.1 | 93 | 32.1 | 0.5 | 1.6 |
| IE 6 | 29.6 | 28.4 | 16.7 | 7.5 | 96 | 34.8 | 0.5 | 1.4 |
| CE 2 | 28.4 | 24.6 | 12.4 | 8.6 | 87 | 25.1 | 1.0 | 1.8 |
| CE 3 | 38.4 | 38.4 | 23.5 | 6.8 | 100 | 42.5 | 0.5 | 0.4 |
| IE 7 | 25.3 | 23.5 | 3.5 | 1.4 | 93 | 7.6 | 2.0 | 2.4 |
| IE 8 | 25.8 | 24.6 | 3.8 | 1.3 | 95 | 8.1 | 2.0 | 2.4 |
| IE 9 | 27.3 | 26.4 | 4.3 | 1.1 | 97 | 8.5 | 2.0 | 2.4 |
| CE 4 | 24.9 | 3.2 | 0.7 | 1.9 | 13 | 2.1 | 3.0 | 2.0 |
| CE 5 | 25.4 | 22.3 | 2.2 | 0.8 | 88 | 4.8 | 3.0 | 2.2 |
| CE 6 | 25.6 | 22.9 | 2.1 | 0.7 | 89 | 4.8 | 3.0 | 2.2 |
| CE 7 | 40.8 | 40.8 | 7.5 | 1.0 | 100 | 16.4 | 3.5 | 2.0 |
| CE 8 | 37.5 | 37.5 | 7.3 | 1.0 | 100 | 15.8 | 3.5 | 2.0 |
| CE 9 | 30.9 | 23.4 | 0.3. | 0.02 | 76 | 1.2 | 4.0 | 2.4 |

TABLE 3-continued

| | aluminum-iron-based plated steel sheet | | | | | Hot Press Formed Member | | |
|---|---|---|---|---|---|---|---|---|
| | PA THK (μm) | AL THK* (μm) | CNT Mg in 0.1 μm deep* (wt %) | CNT O in 0.1 μm deep (wt %) | AL THK Ratio* (%) | CNT Mg in 0.1 μm deep* (wt %) | Corrosion Resistance (Blister Width) | SW CR* (kA) |
| CE 10 | 25.8 | 25.1 | 38.5 | 12.4 | 97 | 51.2 | 0.5 | 0.2 |
| CE 11 | 29.5 | 23.1 | 5.1 | 1.2 | 78 | 12.5 | 1.5 | 2.0 |

PA THK*: Thickness of Plated layer
AL THK*: Thickness of Alloying Layer
CNT Mg in 0.1 μm deep*: Content of Mg at a position 0.1 μm deep
CNT O in 0.1 μm deep*: Content of O at a position 0.1 μm deep
AL THK Ratio*: Thickness Ratio of Alloying Layer
SW CR*: Spot Welding Current Range As can be seen in Tables 1 to 3, Inventive Examples 1 to 9 satisfied all of components of a plating bath, a thickness of a plated layer, contents of magnesium (Mg) and oxygen (O) of a surface, a ratio of an aluminum layer, and alloying heat treatment conditions proposed in the present disclosure, so that a blister width was 2.0 mm or less, a spot welding current range satisfied 1.0 kA or more, and corrosion resistance and spot weldability were excellent.

However, Comparative Examples 1, 2 and 6 are cases in which an alloying heat treatment temperature was less than 670° C. In Comparative Examples 1, 2, and 6, alloying insufficiently occurred, so that a thickness ratio of an alloying layer was less than 90%, for example, a ratio of an aluminum layer was 10% or more. Accordingly, peel-off of the plated layer was observed.

Comparative Examples 3 and 8 were cases in which a plated layer was formed to a large thickness and an alloyed heat treatment was performed at a temperature higher than 900° C. In Comparative Examples 3 and 8, a surface spangle diameter was 5 mm or more and surface quality was poor.

Comparative Example 4 is a case in which an alloying heat treatment was not performed, so that the alloying layer thickness ratio was 13%. Thus, formation of an alloying layer was insignificant, resulting in peel-off of a plated layer. In addition, the content of magnesium (Mg) on a surface after hot press forming was less than 5 weight % (wt %), resulting in poor corrosion resistance.

Comparative Examples 5 and 7 were cases in which a holding time during an alloying heat treatment was outside the range of the present disclosure. In Comparative Example 5, a heat treatment time was significantly short, so that a plated layer was insufficiently alloyed. Accordingly, a plated layer peeled off, and corrosion resistance was deteriorated. In Comparative Example 7, it was confirmed that a plated layer was formed to have a large thickness of 40.8 μm, and a long heat treatment time of 25 seconds was applied, resulting in poor corrosion resistance.

Comparative Examples 9 to 11 are examples in which the content of silicon (Si) and/or magnesium (Mg), among components of an aluminum plating bath, did not satisfy the conditions of the present disclosure. Comparative Example 9 was a case that did not satisfy the content of silicon and the content of magnesium. In Comparative Example 9, an alloying layer ratio was small because the sufficient alloying rate was not secured. In addition, due to the low content of magnesium, sufficient magnesium was not enriched in a surface after hot press forming, resulting in poor corrosion resistance. In addition, peel-off of the plated layer and occurrence of surface spangles were also confirmed. Comparative Example 10 is a case in which the content of magnesium was excessive. In Comparative Example 10, magnesium was more enriched than necessary in a surface of a plated steel sheet, so that spot weldability was deteriorated. Comparative Example 11 is a case in which the content of silicon was excessively added. In Comparative Example 11, an alloying rate was reduced to decrease a ratio of an alloying layer. As a result, peel-off of a plated layer was observed.

While embodiments of the present disclosure have been shown and described, it will be apparent to those skilled in the art that modifications and variations could be made without departing from the scope of the present disclosure. Therefore, the scope of the present disclosure is not limited to the embodiments but should be defined by the appended claims and equivalents thereof.

DESCRIPTION OF REFERENCE NUMERALS

1: HEAT TREATMENT FURNACE
2: ALUMINUM PLATING BATH
3: INITIAL COOLING DEVICE
4: ALUMINUM POWDER SPRAYING DEVICE
5: ALLOYING HEAT TREATMENT DEVICE

The invention claimed is:

1. An aluminum-iron-based plated steel sheet for hot press forming, the aluminum-iron-based plated steel sheet comprising:
   a base steel sheet; and
   a plated layer formed on a surface of the base steel sheet,
   wherein the plated layer comprises:
   an alloying layer formed on the surface of the base steel sheet and containing at least one of $Fe_3Al$, $FeAl(Si)$, $Fe_2Al_5$, and $FeAl_3$; and
   an aluminum layer formed on the alloying layer and having a thickness less than 10% of a thickness of the plated layer, and
   wherein the plated layer has a thickness of 20 to 35 μm and contains 1 to 20 weight % of magnesium (Mg), measured by a glow discharge spectrometer (GDS) at a position 0.1 μm deep from a surface of the plated layer, and 10 weight % or less of oxygen measured by the GDS at the position 0.1 μm deep from the surface of the plated layer.

2. The aluminum-iron-based plated steel sheet of claim 1, wherein the plated layer comprises, by weight %, silicon (Si): 7 to 15%, magnesium (Mg): 1.1 to 15%, and a balance of aluminum (Al) and inevitable impurities, when the other alloy composition, except for the content of iron (Fe) diffused from the base steel sheet, is set to be 100%.

3. The aluminum-iron-based plated steel sheet of claim 1, wherein the base steel sheet comprises, by weight %, carbon (C): 0.04 to 0.5%, silicon (Si): 0.01 to 2%, manganese (Mn): 0.01 to 10%, aluminum (Al): 0.001 to 1.0%, phosphorus (P): 0.05% or less, sulfur (S): 0.02% or less, nitrogen (N): 0.02% or less, and a balance of iron (Fe) and inevitable impurities.

4. The aluminum-iron-based plated steel sheet of claim 3, wherein the base steel sheet further comprises at least one of, a sum of at least one selected from the group consisting of chromium (Cr), molybdenum (Mo), and tungsten (W): 0.01 to 4.0%; a sum of at least one selected from the group consisting of titanium (Ti), niobium (Nb), zirconium (Zr), and vanadium (V): 0.001 to 0.4%; copper+nickel (Cu+Ni): 0.005 to 2.0%; antimony+tin (Sb+Sn): 0.001 to 1.0%; and boron (B): 0.0001 to 0.01%.

5. A hot press formed member obtained by hot press forming the aluminum-iron-based plated steel sheet of claim 1.

6. The hot press formed member of claim 5, wherein a spot welding current range of the hot press formed member is 1 kA or more.

\* \* \* \* \*

UNITED STATES PATENT AND TRADEMARK OFFICE
CERTIFICATE OF CORRECTION

| | | |
|---|---|---|
| PATENT NO. | : 11,529,795 B2 | Page 1 of 1 |
| APPLICATION NO. | : 17/297920 | |
| DATED | : December 20, 2022 | |
| INVENTOR(S) | : Jin-Keun Oh | |

It is certified that error appears in the above-identified patent and that said Letters Patent is hereby corrected as shown below:

On the Title Page

Column 1, (73) Applicants:
"POSCO HOLDINGS, Seoul, (KR)"
Should read:
--POSCO CO., LTD, GYEONGSANGBUK-DO, POHANG-SI, (KR)--

Signed and Sealed this
Twenty-fifth Day of June, 2024

Katherine Kelly Vidal
*Director of the United States Patent and Trademark Office*